|  | $I_1$ | | $I_2$ | |
|---|---|---|---|---|
|  | 0 | 1 | 0 | 1 |
| $2^0$ | INPUT | OUTPUT | READY FOR OPERATION | STOP OPERATION |
| $2^1$ | NO ADJUSTMENT | RESET $A_2$ $A_3$ | NO ALARM | OVERFLOW ALARM |
| $2^2$ | NO PARITY CHECK | CHECK INPUT PARITY | NO ALARM | PARITY ALARM |
| $2^3$ | NO RECOGNITION | CHECK FOR DELINEATOR #1 | NO RECOGNITION | DELINEATOR #1 FOUND |
| $2^4$ | NO RECOGNITION | CHECK FOR DELINEATOR #2 | NO RECOGNITION | DELINEATOR #2 FOUND |
| $2^5$ | NO RECOGNITION | CHECK FOR $K^{th}$ CHARACTER | NO RECOGNITION | $K^{th}$ CHARACTER FOUND |

LEGEND:
DELINEATOR #1 IS A BINARY CODE = 111101
DELINEATOR #2 IS A BINARY CODE = 111110
BAD PARITY REPLACEMENT CODE = 101110

INVENTOR.
ANDREW T. LING
BY
Attorney

Dec. 20, 1966  A. T. LING  3,293,612

DATA PROCESSING

Filed March 28, 1963  9 Sheets-Sheet 7

*Fig. 9a.*

CODE

INVENTOR.
ANDREW T. LING
BY
Attorney

Dec. 20, 1966  A. T. LING  3,293,612
DATA PROCESSING
Filed March 28, 1963  9 Sheets-Sheet 9

INVENTOR
ANDREW T. LING
BY
Attorney

United States Patent Office 3,293,612
Patented Dec. 20, 1966

3,293,612
DATA PROCESSING
Andrew T. Ling, Collingswood, N.J., assignor to Radio
Corporation of America, a corporation of Delaware
Filed Mar. 28, 1963, Ser. No. 268,736
7 Claims. (Cl. 340—172.5)

This invention relates to an improved system for the interchange of raw and processed data between a group of peripheral devices on the one hand and a data processing machine on the other hand.

In the system of the invention, the data processing machine may, for the major portion of its operating time, be solving programmed, data processing problems. Concurrently, raw data may be flowing from peripheral units to buffer storage systems, hereafter termed buffers, associated with the peripheral units. Other buffers may be available to receive processed data from the data processing machine for transmission to peripheral units. The system of the invention includes a control unit which continually scans the buffers and, when they are in condition to receive data from, or send data to, the data processing system, signals this fact to the data processing system. The data processing system, in response to such a signal at spaced, relatively short, time intervals, automatically interrupts, without disrupting, the running program to remove data from a buffer and store it in the memory of the data processing machine and/or to transmit stored data to a buffer.

An important feature of the invention is the storage, in sub-areas of the memory of the data processing machine set aside for the respective buffers, of instruction characters which indicate operations to be performed on the incoming or outgoing data of the respective buffers, for example, whether or not parity should be checked. The instruction characters indicate also the status of such operations, for example, parity has been checked and found to be correct (or incorrect) or, as another example, a complete message has been (or has not been) accumulated in a memory sub-area. These instruction characters are the indirect communication link between the control unit mentioned above and the data processing machine. The control unit has the ability to read out the bits of the instruction characters from a particular sub-area of the memory in the data processing machine, to modify these bits, and to return them to the same locations in the memory. During short intervals within the normal running program in the data processing machine, the machine may sense the respective instruction characters to determine the status of the data stored in the various memory sub-areas. If an instruction character indicates that data is not ready for processing for any reason (for example, a complete message has not been accumulated in a sub-area), the data processing machine continues its normal program. In this way, the data processing machine does not have to remain idle during the receipt from a buffer of a slowly or sporadically transmitted message. When an instruction character indicates that data in a sub-area of the memory is ready for processing, the processing machine may initiate a program sub-routine within the main program to effect the processing of the data.

The invention is discussed in greater detail below and is described in connection with the following drawings of which:

FIG. 1 (comprising FIGS. 1a through 1e) is a drawing showing symbols employed throughout the remaining figures;

FIG. 8 is a chart which identifies the various indicator (I) bits and operations they are associated with; and FIG. 9 which consists of 3 sheets, legended

FIG. 1 is believed to be self-explanatory. The various logic gates illustrate are well known. The function of the gates is given in terms of Boolean equations, or, in the case of the flip-flop, a truth table.

In the various circuits to be discussed below, electrical signals indicative of binary bits are applied to various circuits. For the sake of brevity, the bit itself is often referred to rather than the signal manifesting the bit. In addition, units of information known as characters are employed. A character consists of a number of ordered bits as, for example, six bits. The various bits of a character are sometimes identified by a capital letter along with the number 2 raised to a power. For example, $I_1$ $2^1$ refers to the next to the last bit of the $I_1$ character; $I_2$ $2^5$ refers to the most significant bit of the six bit $I_2$ character.

The purpose of the system of the present invention is to deliver raw data from a number of originating points to a central data processing machine and also to deliver processed data from the machine back to one or more of the originating points or to other locations. While not restricted to a particular type of data processing machine, the invention will be discussed in terms of a general purpose computer system such as the RCA 301. The characters handled by the computer are assumed to have six information bits plus a check bit, although, again, this is not critical.

The RCA 301 computer system mentioned above is a digital, stored program machine which includes a high speed memory, a program control unit and other associated equipments. The high speed memory is a random access magnetic core memory and its operation is discussed later. The memory cycle time is assumed to be 7 microseconds. This cycle time is the total time required to accomplish the following steps: (a) address the memory; (b) obtain access to one or two characters in the memory; and (c) return (regenerate) the character or characters to its (their) original location either in its (their) original form or after modification, if such modification is required.

Figure 1A:
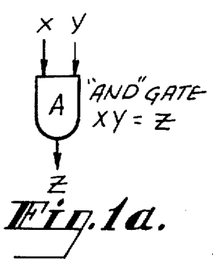
Figure 1B:
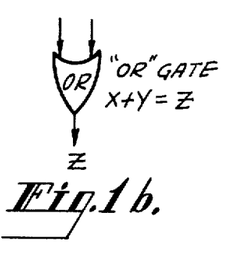
Figure 1C:
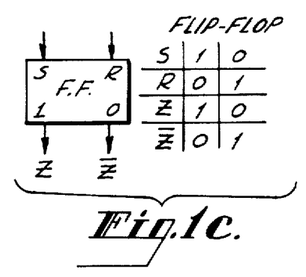
Figure 1D:
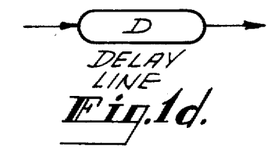
Figure 1E:
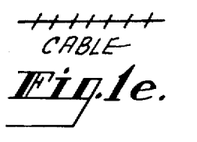
Figure 2:
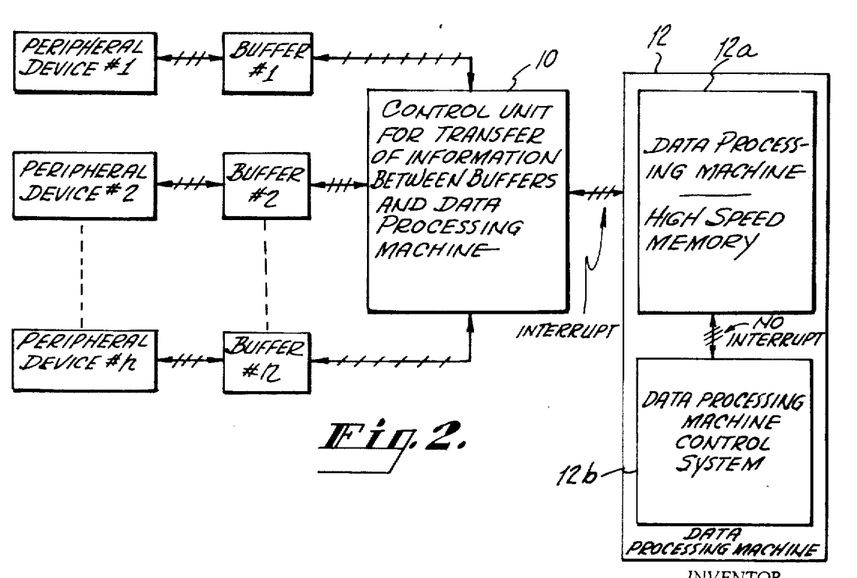
FIG. 2 is a block circuit diagram of the system of the invention.

The system of the invention is shown in block form in FIG. 2. It includes a number of peripheral devices legended peripheral device 1 through peripheral device $n$. In a practical system, $n$ may be some number between 10 and 80 or so. However, the numbers 10 and 80 are not to be taken as limiting. Each peripheral device has associated with it a buffer individual to that device. Buffers are legended with numerals corresponding to their associated peripheral device in FIG. 2. Depending upon the nature of the peripheral device, the buffer may be an input buffer only, or may be an output buffer only, or may be an input-output buffer. As employed here, the term "output buffer" is defined as a buffer which is capable of receiving information fro mthe data processing machine. Similarly, the term "input buffer" is defined as a buffer which is capable of transmitting information from a peripheral device to the data processing machine. The block 10 located between the various buffers and the data processing machine 12 is the control unit for the transfer of information in either direction between the buffers and the data processing machine. This is the unit with which we are here mainly concerned and it will be discussed in greater detail below.

In the operation of the system of FIG. 2, a scanner located in the control unit interrogates the buffers in sequence. During this interrogation, the data processing machine 12 may be performing the various operations called for by a separate program unrelated to the scanning of the buffers. These various operations (those being performed in the data processing machine itself) require, for each access to the memory, 7 microseconds.

The control unit 10 of FIG. 2 can also interrupt a running program for the purpose of communicating with (sending characters to or removing characters from) sub-areas in the memory 17a of the data processing machine, by sending appropriate signals to the data processing machine. The data processing machine control system 12b, upon receipt of such "interrupt request" signals from the control unit 10, temporarily interrupts its own accessing of the memory and allows the control unit 10 to have an access to memory instead. This does not disrupt the program which is then being run in the data processing machine but merely halts it for a short time. When the interrupt interval is over, the data processing machine control system 12b resumes its normal operation, interacting with the memory to continue the running of the program which was temporarily interrupted, until the next interrupt request occurs.

In the present system, the operations called for by the program may be interrupted, at most, for one memory cycle (one memory access interval) each $x$ memory cycles. The value chosen for $x$ in a practical installation depends upon the number of peripheral devices, their speed, the amount of traffic generated by the peripheral devices compared to the amount of data processing required by other programs, and other factors. In a practical system, $x$ may be some number from, say 4 to 24. For purposes of the present discussion, it is assumed that $x$ is 4, that is, the control unit 10 may request a maximum of one cycle in each 4 memory cycles for communication with the peripheral devices.

Returning to the scanning of the buffers, the scanning circuit may be controlled by clock pulses generated in the central timing system of the data processing machine. It is assumed for the present that the stepping time of the scanner is 7 microseconds per buffer. It is also assumed, and this is normally the case, that the peripheral devices supply information to their buffer at a relatively slow rate compared to the rate at which data can be processed. A peripheral device such as 1, for example, may supply bits serially to buffer 1 and may do this synchronously or asynchronously. For purposes of explanation, it is assumed that the peripheral device 1 is an asynchronous device. It is also to be assumed that the average spacing between bits is say 1000 microseconds (1 millisecond). This means that, on an average, it requires at least 7 milliseconds for the 7 bits making up a character to be transferred from a peripheral device to a buffer. Further, the operation of a peripheral device, such as 1, may be intermittent by character as opposed to continuous.

Whenever an input buffer has stored the 7 bits of a character and is therefore in condition to transfer this character to the data processing machine, that buffer generates a signal, hereafter termed a "ready" signal. In a similar manner, an output buffer, when called upon by its peripheral device to transfer data from the data processing machine to the peripheral device, generates a ready signal. Upon receipt by the control unit 10 of a ready signal from a buffer, the scanner of the control unit essentially stops at that buffer. Thereafter, in a manner to be discussed shortly, the character is transferred from the buffer through the control unit to a given location in the memory 12a of the data processing machine or from the memory to the buffer.

In the data processing machine under discussion, four decimal character are used to address a memory location. (Each character needs to have only 4 bits but, in practice, six bits are used, the two most significant bits being 0.) These characters are hereafter termed $A_0$, $A_1$, $A_2$, $A_3$. These four characters together are the address in the memory of two successive six bit characters. The high speed memory of the data processing machine is divided up into one relatively large area which may be the portion of the memory which is set aside for storing both data words and instruction words which are necessary for performing the various programs which the data processing machine normally performs. In addition, in accordance with the present system, another portion of the memory is divided into $n$ sub-areas, each sub-area being set aside for a different one of the buffers. Each sub-area may be of a size sufficient to store say 100, 6 bit characters. The first part, $A_0$, $A_1$, of the memory address of each sub-area is related to the scanner position.

In the present system, the scanner consists of a binary or other type of counter and a decoder. The decoded count is employed not only to select a buffer which is to be interrogated but also as the $A_0$ and $A_1$ of the four characters used to address the memory. In practice, the code generated by the scanner of the control unit is converted by a binary to decimal converter to two decimal characters $A_0$, $A_1$ as is discussed in more detail later.

Returning to the scanner in the control unit 10, when the ready signal of a buffer is detected, the scanner stops at the scan position of that buffer. The code generated by the scanner is converted by the binary to decimal decoder to the characters $A_0$, $A_1$. The remainder of the address in the memory is the fixed address 00, 01. 00 and 01 are the first two locations in each memory sub-area. For example, suppose the scanner stops at buffer 38. Suppose also that memory sub-area 3800, that is memory locations 3800–3899 are set aside for buffer 38. The address that is generated is $A_0=3$, $A_1=8$, $A_2=00$, $A_3=01$.

The locations 00, 01 in each memory sub-area store the addresses in that sub-area at which the next character is to be stored or from which the next character is to be removed. For example, in memory location 3800 the character 6 (000110) may be stored and in memory location 3801 the character 2 (000010) may be stored. This means that in the case in which the buffer 38 is an input buffer and it desires to transfer a character to the high speed memory, that character will be transferred to memory sub-area 3800 storage location 62, that is, character storage location 3862.

According to the present system, there is also stored at fixed locations (02 and 03) in each memory sub-area two 6-bit instruction characters $I_1$, $I_2$. These characters indicate operations to be performed with that buffer, such as whether a character is to be transmitted from a buffer to the memory or vice versa. In general, the number of instructions can be as large as the number of binary combinations which are possible of the instruction bits. A decoding device may be used to determine the particular combination. For simplicity and practical description, however, some of the I bits are stated individually to be commonds (operations to be performed with respect to a data character) and others are stated individually to be indicators, that is, manifestations of the status (for example, whether or not completed) of the various operations. Since there are six $I_1$ bits and six $I_2$ bits, the total number of command plus indicators is twelve in this example. The I bits are sensed during the processing machine program. For example, one of the $I_1$ bits may be a command to check in control unit 10 the parity of a data character desired to be transferred into the memory of the processing machine, before that character is transferred. The control circuits in the control unit 10 will, if the character does not have the correct parity, do something to indicate this to the data processing machine. In one practical case, if the parity of a character is incorrect, that character is not stored in the high speed memory but instead a six bit octal character $57_8$ (101111) is stored and a "1" is stored in the corresponding bit of the $I_2$ bits to indicate this fact.

As another example, certain bits of the $I_1$ character may command the control unit to determine whether a character being transferred into the memory of the data processing machine is the "$K^{th}$ character." The $K^{th}$ character may refer to a character destined to be the last character of a message to be stored in a memory sub-area. It will be recalled that in the practical example there are 100 storage locations per memory sub-area. These locations extend from 00 through 99. The 00 and 01 locations store the address characters $A_2, A_3$. The 02 and 03 locations store the instruction characters $I_1$, $I_2$, respectively. Any other storage location(s) may be reserved for programming use. The rest are for data use. Say the $83^{rd}$ storage location may, if desired, be selected as the $K^{th}$ storage location if a message is 80 characters in length. If the control unit 10 determines that a character just transferred into a particular sub-area of the memory is stored in the $K^{th}$ or $83^{rd}$ character location in that sub-area, the control unit places a "1" in the address in the same sub-area reserved for the appropriate I bit (here the bit $I_2$ $2^5$). At an appropriate time, the data processing machine senses this bit and initiates a sub-routine which transfers the entire contents of this particular memory sub-area to another part of the memory. The sub-routine may also change the stored characters $A_2$, $A_3$ from 83 to 04, where 04 is the first storage location available for data in the memory sub-area. The sub-routine may also change the value of the indicator bit $I_2$ $2^5$ back to "0," thus allowing this sub-area to start receiving more characters. (A somewhat more detailed discussion of the interruption of a running program to initiate a sub-routine appears later.)

Still two other bits of the $I_1$ character may command a check to be made to determine whether a data character denotes the start of a message or the end of a message. Special characters known as "delineator characters" are employed to do this. Upon receipt of the appropriate delineator character, the control unit 10 places a "1" in the corresponding bit positions of the $I_2$ character in the memory. The data processing machine, at appropriate short intervals within a program, senses these bits and initiates a sub-routine to take care of this condition as in the case of the receipt of the $K^{th}$ character. A number of specific illustrations of operations called for by I bits are discussed in more detail later in connection with FIG. 9.

Figure 3:
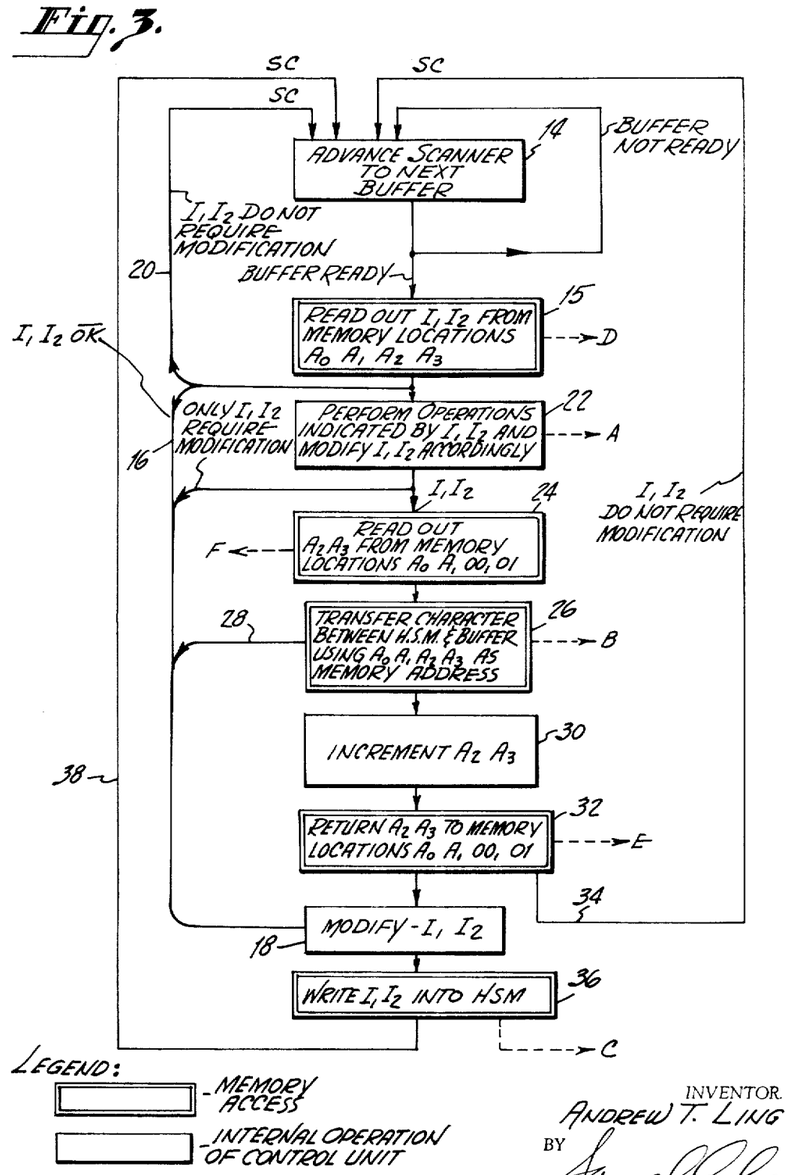
FIG. 3 is a flow chart illustrating the operation of the system of the invention.

A flow chart illustrating the operation of the present system appears in FIG. 3. The scanner may be assumed to be stepping from one buffer to the next as illustrated by block 14. If the buffer being interrogated is not ready to transfer data to the high speed memory or to receive data from the high speed memory, the scanner advances to the next buffer. If the buffer is ready, the scanner stops at that buffer. After the scanner stops, the memory interrupt interval occurs and the memory is addressed by the four characters $A_0$, $A_1$, 02, 03, where $A_0$, $A_1$ refer to the memory sub-area assigned to the particular buffer at which the scanner has stopped, and 02, 03 are the fixed locations in that sub-area at which the sub-area at which the instruction characters $I_1$, $I_2$ are stored. During this memory interrupt interval, the characters $I_1$, $I_2$ are read out of the locations specified. These characters may indicate either that certain operations are to be performed or that, for one reason or another, the memory cannot accept information from or supply information to a buffer at that time. The latter condition is indicated by lines 16 and 20. The legend $I_1$, $I_2$ $\overline{OK}$ applies to line 16. In the latter case, the characters $I_1$, $I_2$ may require modification, in which case they will be modified in the control unit 10 as indicated by block 18. Alternatively, these characters may not require modification in which case a signal will be applied to the control unit to advance the scanner. The last condition is illustrated by line 20. In this last case, it should be appreciated that before the scanner is advanced, that is, during the same 7 microseconds memory interrupt interval, the characters $I_1$, $I_2$ have been regenerated into the memory.

After the characters, $I_1$, $I_2$ have been read out of the memory, the next step may be for the control unit 10 to perform certain operations indicated by $I_1$, $I_2$. This step is illustrated by block 22. After these operations are completed, it may be that the characters $I_1$, $I_2$ may require further modification as indicated by block 18, or the I characters may indicate that the address characters $A_2$, $A_3$ may be read out of the memory. In the latter case, the memory is addressed by $A_0$, $A_1$, 00, 01. 00, 01 is the location in the memory sub-area $A_0$, $A_1$ at which the actual address $A_2$, $A_3$ is located. These characters ($A_2$, $A_3$) are read out and stored in the memory address register, as indicated by block 24. The read out of $A_2$, $A_3$ occurse during a memory interrupt cycle, following the one during which characters $I_1$, $I_2$ are read out. For example, in the case in which the memory interrupt cycle is one in four, if, starting at zero time, the read out of $I_1$, $I_2$ occurs during the interval from 0 to 7 micro-seconds, the read out of $A_2$, $A_3$ occurs during the interval from 28 to 35 microseconds.

After $A_2$ and $A_3$ have been read out and stored in the memory address register, during the next memory interrupt cycle (the 7 microsecond period from 56 to 63 microseconds) the data character is transferred from the high speed memory to the buffer (in the case in which the buffer is an output buffer) or from the buffer to the high speed memory (in the case in which the buffer is an input buffer). All this is indicated at block 26.

In some circumstances it may be necessary at this point to modify $I_1$ and $I_2$ as indicated by line 28. However, ordinarily it will be necessary to modify $A_2$, $A_3$ as, for example, by incrementing by one the decimal number these characters designate, and it may also be necessary to modify $I_1$, $I_2$. This is indicated by blocks 30 and 18. At the next program interrupt interval the modified $A_2$, $A_3$ is rewritten back into the high speed memory as indicated by block 32. Thereafter, $I_1$, $I_2$ are modified, if required, (but not modified if not required) and written back into the high speed memory as indicated at 18, 34 and 36. Thereafter, a signal is generated and is applied to the scanner which causes the scanner to resume its operation, stepping from buffer to buffer.

Figure 4:
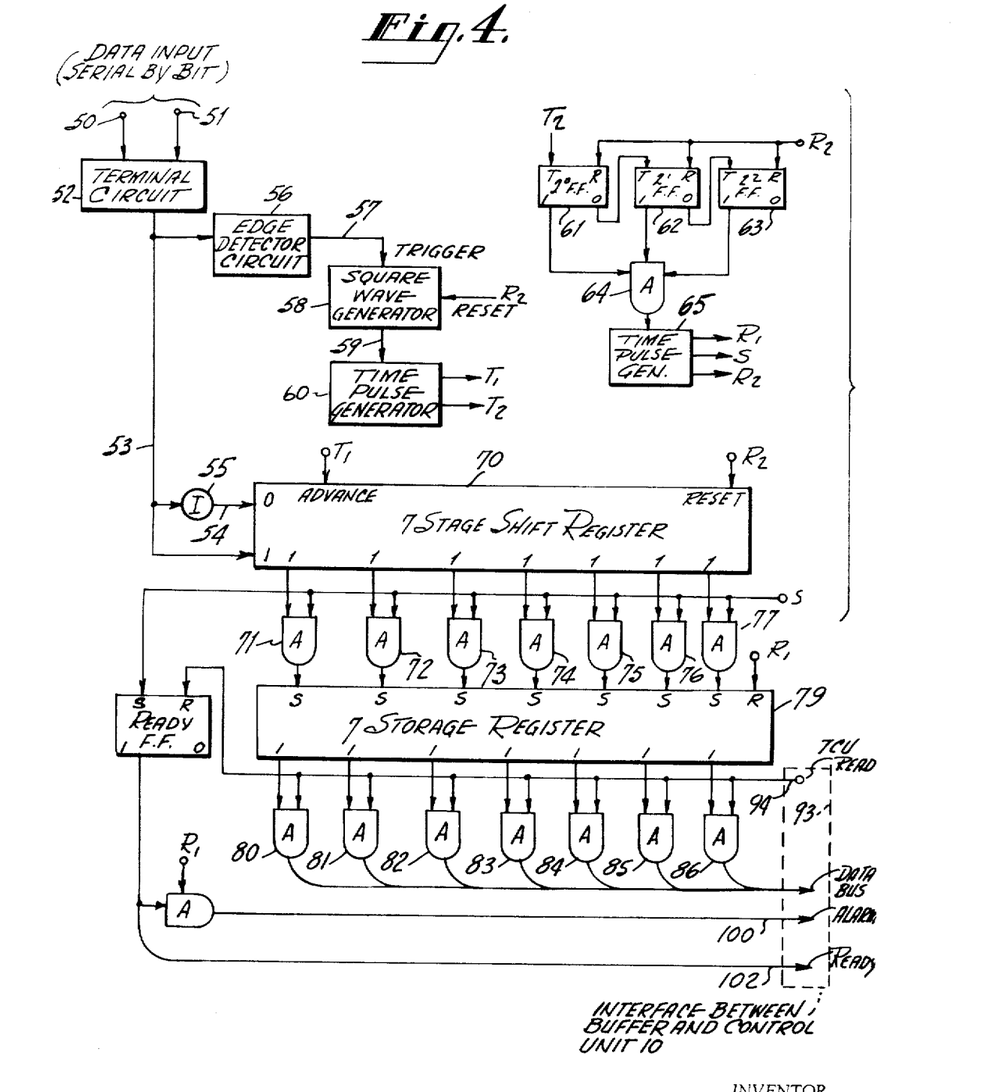
FIG. 4 is a block circuit diagram of a typical input buffer storage system which is suitable for use in the invention.

FIGURE 4 illustrates a typical input buffer. Similar principles of operation apply to an output buffer and an input-output buffer and therefore they are not discussed separately. The buffer receives input signals serially by bit at the terminals 50 and 51 of the terminal circuit 52. This terminal circuit is a means for converting the input signals whatever their code, into binary signals at lead 53. The inverter 55 produces the complements of these signals at lead 54. The binary signals on leads 53 and 54 are applied to the data inputs of a 7-stage shift register 70 which is capable of storing the 7 bits making up a character. The shift register is initially reset to store all zeroes.

The binary signal present on lead 53 is also applied to an edge detector circuit 56 which may be a one-shot multivibrator or Schmitt trigger circuit. When the first signal of a seven-bit character is detected (as may be seen in FIG. 5, this "start" signal is always a "one" and precedes the bit characters), the detector output signal on lead 57 triggers a square wave generator 58. The square wave generator signal train thereby produced on lead 59 causes the pulse pairs $T_1$ and $T_2$ to be produced by the time pulse generator 60 (one pair of pulses $T_1$, $T_2$ is produced each cycle of the square wave).

Pulse $T_1$ is applied to the advance terminal of the shift register 70 that stores that data input signals taken from leads 53 and 54. Pulse $T_2$ is applied to the trigger terminal of the first stage 61 of a three stage counter 61, 62, 63 which is assumed to be initially reset to all zeroes. AND gate 64, which is connected to the "1" output terminal of all three flip-flops of the counter, responds to the binary count 111. The count occur after seven time pulse pairs have been generated. When this occurs, AND gate 65 triggers a second time pulse generator 65. Time pulse generator 65, when triggered, generates a sequence of three time pulses $R_1$, S and $R_2$. Pulse $R_1$ resets a 7-stage storage register 79. Pulse S primes the AND gates 71 to 77, which gates connect the 1 output terminals of the shift register 70 to the set input terminals of the storage register. Thus, the data stored in the shift register 70 is transferred to the storage register 79. In addition, pulse S sets a ready flip-flop 87. Pulse $R_2$ is applied to (a) the reset terminal of the shift register 70 resetting it to store all zeroes; (b) the reset terminal of three-stage counter 61, 62, 63 resetting them to zeroes; and (c) the reset terminal of the square wave generator 58. In so doing, these portions of the input buffer are prepared to receive the next 7-bit character.

Figure 5:
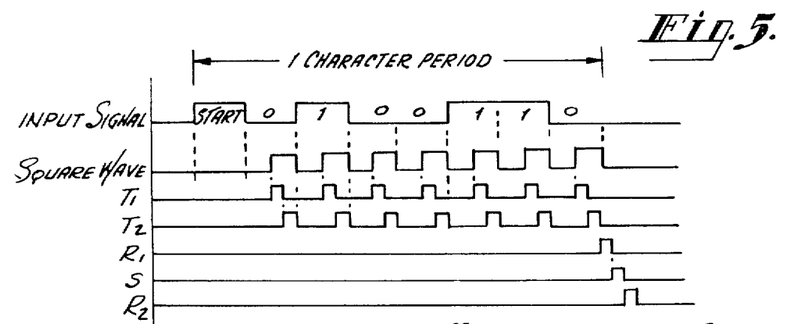
FIG. 5 is a drawing of waveforms present in the circuit of FIG. 4.

A typical timing chart for a 7-bit character operation is shown in FIGURE 5. Each character may occur synchronously or asynchronously. For this illustration of 7-bit characters, the input signals at terminals 50, 51 are shown to occur in 8 serially occurring bit periods. The signal in the first bit period is always a "one," used to denote the start of a character. The detection and starting of the square wave generator 58 take a bit period. The square wave train on lead 59 has a frequency which corresponds to that of the bit period but the positive portions of the square wave occur during the middle of each of the subsequent bit periods. The polarity of the input signals on leads 50, 51 is strobed by pulse $T_1$ in the following 7-bit periods, to determine the "ones" and "zeroes" of the character. In FIGURE 5, the illustration is the bit pattern of 0100110, which pattern is stored in shift register 70. When the 7-bits are counted and recognized by AND gate 64, one series of $R_1$, S, $R_2$ pulses are generated.

The "1" output terminals of the storage register 79 of FIG. 4 are connected through AND gates 80–86 to the data bus 93, which in turn is connected to the control unit 10 of FIG. 2. The second input to the AND gates 80–86 is the TCU read signal which is transmitted from the control unit 10 to terminal 94. The TCU read signal is also applied to the reset (R) terminal of the ready flip-flop 87. The ready flip-flop 1 output terminal is connected to the ready terminal 102. This signal indicates to the control unit 10 that a character is ready to be transferred into the memory of the data processing machine and that the control unit 10 must generate at TCU read signal before the next character is accumulated. The AND gate 88, connected to the 1 output of the ready flip-flop and strobed by pulse $R_1$, produces an alarm signal. This signal is applied to the alarm terminal 100 and indicates that the character stored in the storage register 79 has not been read by the control unit even though the next character is being gated into the storage register from the shift register 70.

Figure 7:
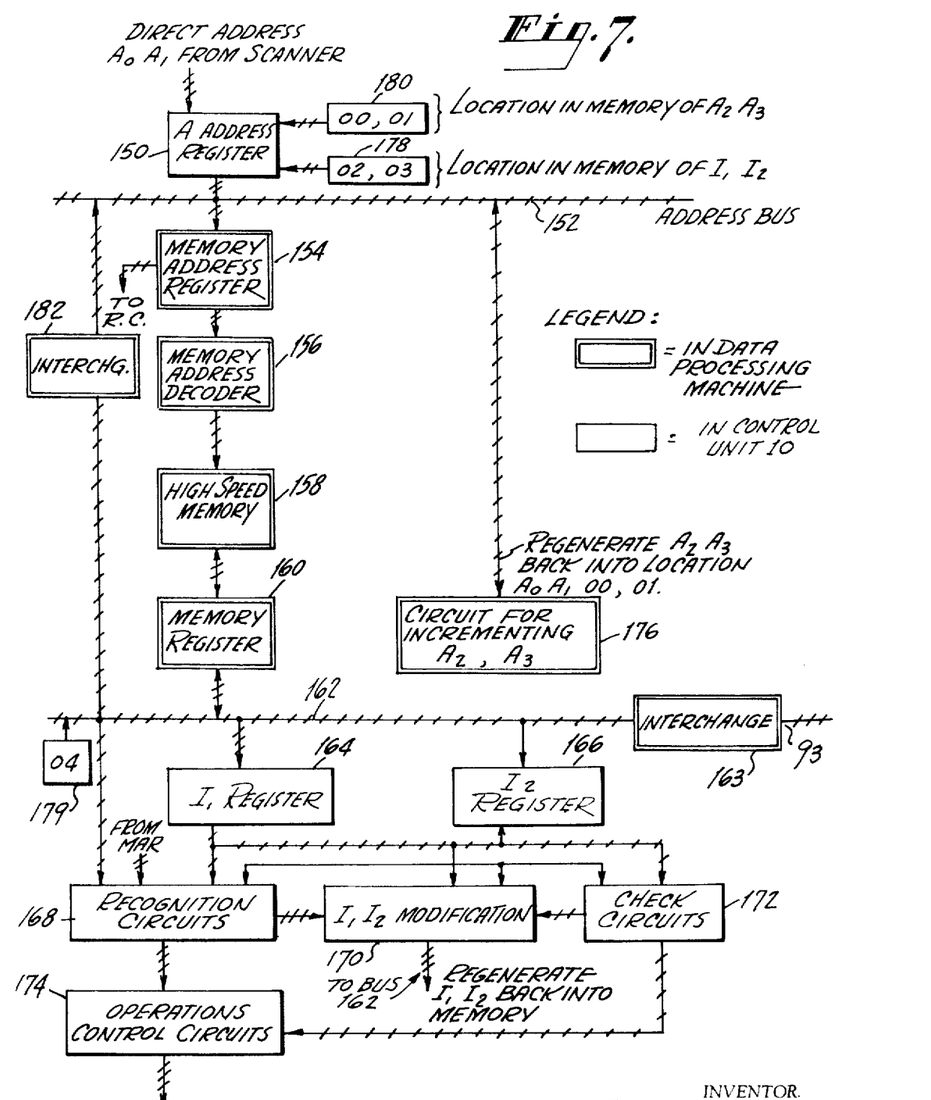
FIG. 7 is a block circuit diagram of various stages in the high speed memory 12 of FIG. 2 and other stages in the control unit 10 of FIG. 2.

When the control unit 10 of FIGURE 2 is ready to receive the character, it applies the TCU read signal to input terminal 94. As shown in FIGURE 7, the character may be transferred to the control unit 10 via data bus 93 as direct current (data) levels. During a selected memory interrupt interval, this character passes into the memory register, via interchange gates 163, as shown in FIGURE 7, and into the high speed memory in the 301 computer.

Figure 6:
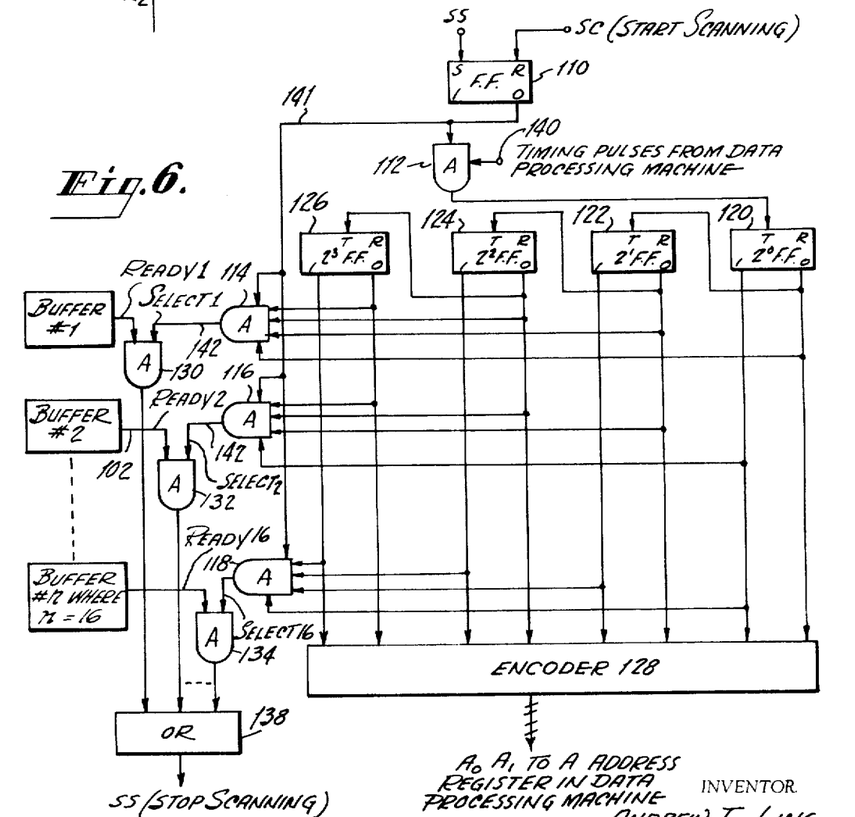
FIG. 6 is a block circuit diagram of a scanner which is part of the control unit 10 of the system of FIG. 2.

A 16 position scanner in the control unit 10 is shown in FIG. 6. The scanner includes an input flip-flop 110. The set terminal of the flip-flop is connected to receive an SS (stop scanning) signal at its set terminal and SC (start scanning) signal at its reset terminal. The 0 output terminal of the flip-flop provides a priming signal to AND gate 112 and to 16 additional AND gates, three of which 114, 116 and 118, are shown. The output signal of AND gate 112 is applied to the trigger terminal of a ring counter 120, 122, 124, and 126. In practice the ring counter must include at least a sufficient number of stages to permit all positions to be scanned. In the present instance in which 16 positions are assumed, the ring counter is shown to have four stages. The 1 and 0 outputs of the flip-flops making up the ring counter are connected in the 16 different permutations of 4 binary bits (16 different codes) which are possible to the inputs to the 16 AND gates 114–118. The 1 and 0 outputs of the flip-flops are also connected to an encoder 128.

The outputs of the 16 AND gates 114–118, are each connected to a different one of 16 other AND gates. Three of these other AND gates are shown at 130, 132 and 134. The second input to the respective AND gates 130–134 is the ready signal from the various buffers, as indicated. The outputs of the AND gates 130–134 are connected to an OR gate 138.

In the operation of the scanner of FIG. 6, it may first be assumed that none of the buffers is ready. In this event, each buffer has a zero on its ready output lead so that none of the AND gates 130–134 is primed. It may also be assumed that a start scanning signal SC (which may be derived from a command pulse from the data processing machine or may result from operations such as indicated by lines 20, 34 or 38 in FIGURE 3) has been applied to the reset terminal of the flip-flop 110. Thus causes a 1 to be present at the 0 output terminal of flip-flop 110 so that AND gate 112 is primed. The second input to the AND gate consists of timing pulses from the data processing machine, which pulses are applied to terminal 140. While the repetition frequency of these pulses is not critical, it may be assumed for purposes of the present discussion that they are spaced 7 microseconds from one another. Therefore, each 7 microseconds AND gate 112 produces an output and the ring counter 120, 122, 124, 126 advances its count by one. The AND gates 114–118 are all primed by the "one" appearing on lead 141. AND gate 114 is connected to the 0 output terminals of all of the flip-flops (it responds to the code 0000). Therefore, during the first 7 microseconds, AND gate 114 is enabled and a "select 1" signal appears on lead 142. However, the buffer 1 is not ready so that no signal appears on the "ready 1" lead. Therefore, AND gate 130 is disabled and there is no SS output from OR gate 138.

The first timing pulse applied to terminal 140 causes the count to advance to 0001. This count enables AND gate 116 and it produces a "select 2" signal on lead 142. However, the buffer 2 is not ready so that AND gate 132 does not produce an output. This process continues with the successive AND gates 114, 116, and so on being activated in sequence until the last AND gate 118 is activated. Thereafter, the counter steps back to AND gate 114 and enables it again continuing to cycle so long as no buffer is ready.

Assume now that buffer 2 has stored a character in its seven stage storage register 79 (see FIG. 4). When this occurs, a "ready 2" signal appears on its output lead 102. This signal primes AND gate 132. When the ring counter is stepped to the count 0001, AND gate 142 produces a 1 on its select one output lead 142. This causes AND gate 132 to be enabled and it applies a 1 to OR gate 138. The OR gate thereupon produces the SS (stop scanning) signal which is applied back to the set terminal of flip-flop 110. This causes the priming signal on lead 141 to change to 0 disabling AND gate 112 and the 16 AND gates 114–118. Therefore, the ring counter stops advancing and remains delivering the code 0001 which calls for the buffer 2.

The code produced by the ring counter corresponds to the $A_0$, $A_1$ portion of the address in the high speed memory. In otherwords, the count corresponds to the memory area (the 100 character storage location) set aside for buffer 2. However, in the computer under discussion the memory address consists of four decimal characters. It is therefore necessary to convert the binary number appearing at the output of the ring counter to two decimal numbers. This is accomplished by the binary to decimal encoder 128.

To simplify the present discussion, the ring counter in FIG. 6 is shown as having only four stages. In practice, the ring counter will have a minimum of 7 stages since $2^7 = 128$. In other words, the number of stages in the ring counter has to be sufficient to generate a binary number equal at least to 100. The binary-to-decimal encoder 128 is a known circuit and its specific mechanization is not important in this discussion. It functions to convert a binary code as, for example, the code 0110110 (which corresponds to demical 54) to the binary coded decimal characters of corresponding value 0101, 0100 namely decimal 54. It might also be mentioned that the binary coded address of the particular data processing machine under discussion include 6 bits for $A_0$ and 6 bits for $A_1$. The most significant two bits of each decimal character $A_0$ and $A_1$ therefore always retain the value 0.

FIG. 7 illustrates a portion of the high speed memory of the data processing machine and the circuits associated with the memory. Many of these circuits are standard circuits which are discussed in detail in standard reference works. Therefore, the timing pulses and minor circuit details which are not necessary to an understanding of the present invention, are not included.

The A address register which temporarily stores the memory address is shown at 150. It is connected to an address bus 152 and the address bus is connected to the memory address register 154 and the $A_2$, $A_3$ incrementing circuit 176. The memory address register is connected to a memory address decoder 156 which in turn is connected to the high speed memory 158. The high speed memory is connected to a memory register 160 which in turn is connected to the data bus 162 which is a two-character bus. The data bus 162 is also connected to the $I_1$ and $I_2$ registers 164 and 166. The I registers in turn are connected to various recognition circuits 168, to $I_1$ and $I_2$ modification circuits 170, and to check circuits 172. The recognition and check circuits are connected to operations control circuits 174. The address bus 152 is connected to the data bus via an interchange circuit 182. The interchange circuit is a set of AND gates connecting one bus into another bus in either or both directions. The interconnection of the gates and their timing are controlled by signals appearing on select lines (not shown in FIG. 7). A more detailed showing of interchange circuits appears in FIG. 9 and is discussed later.

In the operation of the system of FIG. 7, when the scanner of the control unit stops at a particular buffer, the decimal address obtained from the encoder 128 (FIG. 6) is applied to the A address register 150. At the same time, a code indicative of the address location 02, 03 is applied from circuit 178 to the A address register. If the high speed memory 158 is in condition to be accessed the next time a memory interrupt interval occurs, the address stored in the A address register 150 is applied via the address bus 152 to the memory address register 154. The memory address decoder decodes this address and applies it to the high speed memory 158. The memory register 160 thereupon reads out the I characters $I_1$ and $I_2$ from location $A_0$, $A_1$, 02, 03 and applies these I bits to the $I_1$ and $I_2$ registers 164 and 166. The circuits 168, 170 and 172 thereupon perform certain operations indicated by the I bits. Specific ones of these operations which are representative are discussed in more detail later in connection with FIGS. 8 and 9.

If as a result of the above operations the various control circuits indicate that the high speed memory is in condition to accept a character from the buffer or to transmit a character to the buffer, then during the next interrupt interval, the circuit 180 supplies the address 00, 01 to the A address register. The address $A_0$, $A_1$, 00, 01 is thereafter applied from the A address regster through the address bus to the memory address register 154. This address is decoded by the memory address decoder 156 and the memory register 160 reads out the contents of address $A_0$, $A_1$, 00, 01 from the memory. The information read out is the actual value of $A_2$, $A_3$, that is, the location in the memory sub-area $A_0$, $A_1$ at which the next character is to be stored or from which the next character is to be read out. For example, $A_2$, $A_3$ may equal some number such as 49 which indicates that the next character is to be stored in or read out from location 49 of the particular sub-area $A_0$, $A_1$. The $A_2$, $A_3$ character is applied back via interchange circuit 182 to the A address register 150 and later to the memory address register 154 so that the memory address register now stores the address $A_0$, $A_1$, $A_2$, $A_3$.

During the next memory interrupt interval, the memory address decoder applies the address above to the high speed memory. Assume that a character is to be read into the memory. This character appears on the data bus 93. It flows through the interchange circuit 163 onto one of the two character buses 162 depending on the $A_0$, $A_1$, $A_2$, $A_3$ address being odd or even. From bus 162, it goes to the memory register 160 and to the address $A_0$, $A_1$, $A_2$, $A_3$ indicated by the memory address decoder 156.

The $A_2$, $A_3$ modification circuit may include, for example, an incrementing circuit 176. If the character being stored is stored at location 49, the circuit 176 changes the address $A_2$, $A_3$ to 50 so that the next character which arrives will be stored at location 50 in the memory sub-area $A_0$, $A_1$.

When the option of modifying $A_2$, $A_3$ is used, address characters 04 are sent from the 04 generator circuit 179 onto the data bus 162 rather than to the interchange 182. This operation causes the current $A_2$, $A_3$ value to be changed back to its initial value 04. The circuit is shown in detail in FIG. 9.

During the next memory interrupt interval, the A address register 150 applies to the memory address register 154 the address $A_0$, $A_1$, 00, 01 once more. At this time, the modification circuit 176 applies to the memory the modified $A_2$, $A_3$ so that this modified address is stored in location 00, 01.

During the next memory interrupt interval, the A address register again addresses the memory register with the address $A_0$, $A_1$, 02, 03. At this time, the $I_1$, $I_2$ modification circuit 170 applies the characters $I_1$ and $I_2$ to the location $A_0$, $A_1$, 02, 03 in the high speed memory via the data bus 162 and memory register 160. A typical modification of $I_1$, $I_2$ is discussed shortly in connection with FIG. 9.

The writing of $I_1$ and $I_2$ back into the high speed memory completes the five interrupt cycles required to read a character from a buffer into the high speed memory or vice versa. Thereafter, the circuit to be discussed shortly, generates the SC (start scanning) signal and applies it to the reset terminal of the flip-flop 110 of FIG. 6. This causes the scanner in the control unit again to step from buffer to buffer at 7 microsecond intervals.

Figure 8:
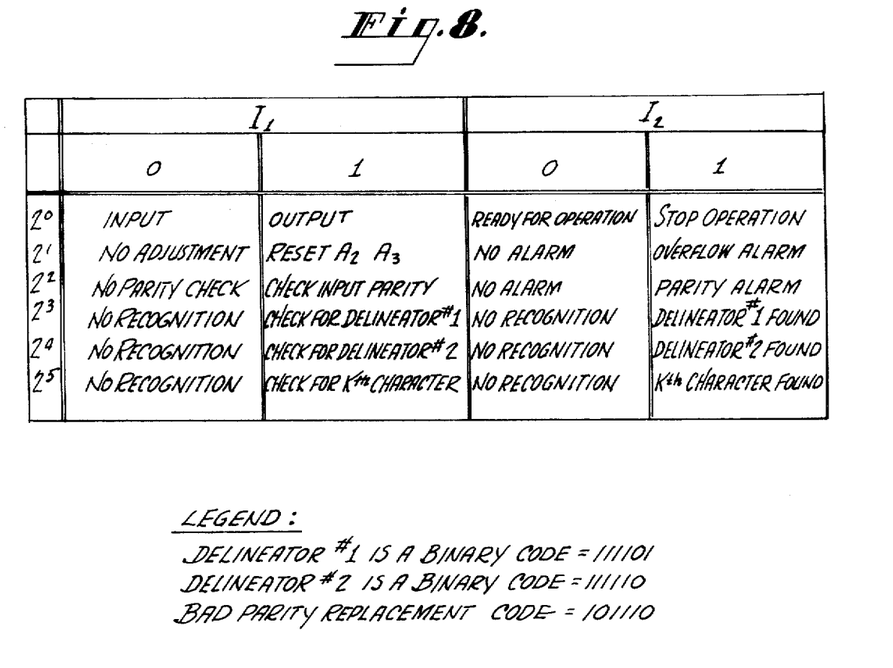

The chart of FIGURE 8 illustrates typical operations to which the $I_1$ and $I_2$ characters may be assigned. For this illustration, the 6 bits of the $I_1$ character and the least significant bit $2^0$ of the $I_2$ character are commands and the remaining 5 bits of the $I_2$ character are indicators. It should be remembered that when the scanner stops at a bluffer, the $I_1$, $I_2$ bits are read out from the 02, 03 memory locations in the data processing machine memory and applied to the $I_1$, $I_2$ registers in the control unit 10 of FIGURE 2. The values of these bits, combined with the interface signals (such as "alarm," "ready" etc. shown at lower right of FIG. 4) between the control unit 10 and the buffers, determine the operations to be performed for this buffer and their sequence. It should also be remembered that the program in the data processing machine has access to these bits by internal order codes and, thus, has the ability to alter the I bit patterns at any time.

According to FIGURE 8, the $I_1$, $2^0$ bit, if it is a "0," commands the control unit to transfer data from the buffers to the data processing machine and, if it is a "1," commands the control unit to transfer data stored in a sub-area in the data processing machine memory to the buffer. This bit is particularly useful in those cases in which a buffer is a two-way buffer, that is, a buffer having the ability to transmit to as well as to receive from the data processing machine. In the case of a one-way buffer, such as an input only buffer, or an output only buffer, this bit should always retain a fixed value, that is, a "0" if the buffer is an input only buffer and a "1" if the buffer is an output only buffer.

The $I_2$, $2^0$ bit, if it is a "0," indicates that the subarea for this buffer is ready for operation; and if it is a "1," indicates that the sub-area is not ready for any operation. This bit can be set to a "1" by the control unit 10, when any alarm condition results, and in this way prevent further operation of a particular buffer. The bit may also be set to a "1" by the data processing machine program for any reason to terminate communication between the data processing machine and the buffer.

The $2^1$ to the $2^5$ bits, respectively, of the $I_1$ and $I_2$ characters are related to each other. In general, the $I_1$ bit commands the control unit to perform a certain function such as a check or a recognition and the corresponding $I_2$ bit indicates the result of the performance of that function. When the $I_1$ bit is a "0," the control unit is commanded not to perform that function. When the $I_2$ bit is a "0," it indicates that the condition or operation referred to by the corresponding $I_1$ bit has not yet occurred, i.e., the $K^{1th}$ character is not present.

To illustrate the above, if the $I_1$, $2^1$ bit is a "1," the control unit is commanded to change the value of the $A_2$, $A_3$ characters back to 04, their initial value, before returning these characters to the 00, 01 memory locations of their sub-area. Referring back to FIGURE 3, the operation of storing characters in memory location 00, 01, indicated by block 32, is in this instance controlled by the 04 generator in FIG. 7 rather than the $A_2$, $A_3$ registers. In addition, in the following operation, indicated by block 18 of FIG. 3, both the $I_1$ $2^1$ bit and the $I_2$ $2^1$ bit are reset to "0" before $I_1$ $I_2$ are returned to the memory location 02, 03 (see block 36 of FIG. 3). The $I_2$ $2^1$ bit is set to a "1" by the control unit 10 whenever an "overflow count" has been reached (the operation depicted by block 24 in FIGURE 3). This ($I_2$ $2^1$=1) denotes an overflow alarm. In actual practice, the $I_2$ $2^0$ bit is set to "1" at the same time that this occurs, and no further operation is performed with this buffer until the alarm condition has been corrected by the data processing machine program.

The $I_1$ $2^2$ bit, when it is a "1," commands the control unit 10 to check the input data for correct parity. If the bit is a "0," no parity check needs to be made. When a parity error is detected, the $I_2$ $2^2$ bit is changed to a "1" to indicate the detection of this error. Furthermore, as mentioned previously, the character with a parity error may be replaced with a special code.

The function of the $2^3$, $2^4$ and $2^5$ bits are similar to that of the $2^2$ bit, except that each controls a different operation, as described in FIGURE 8.

Figure 9A:
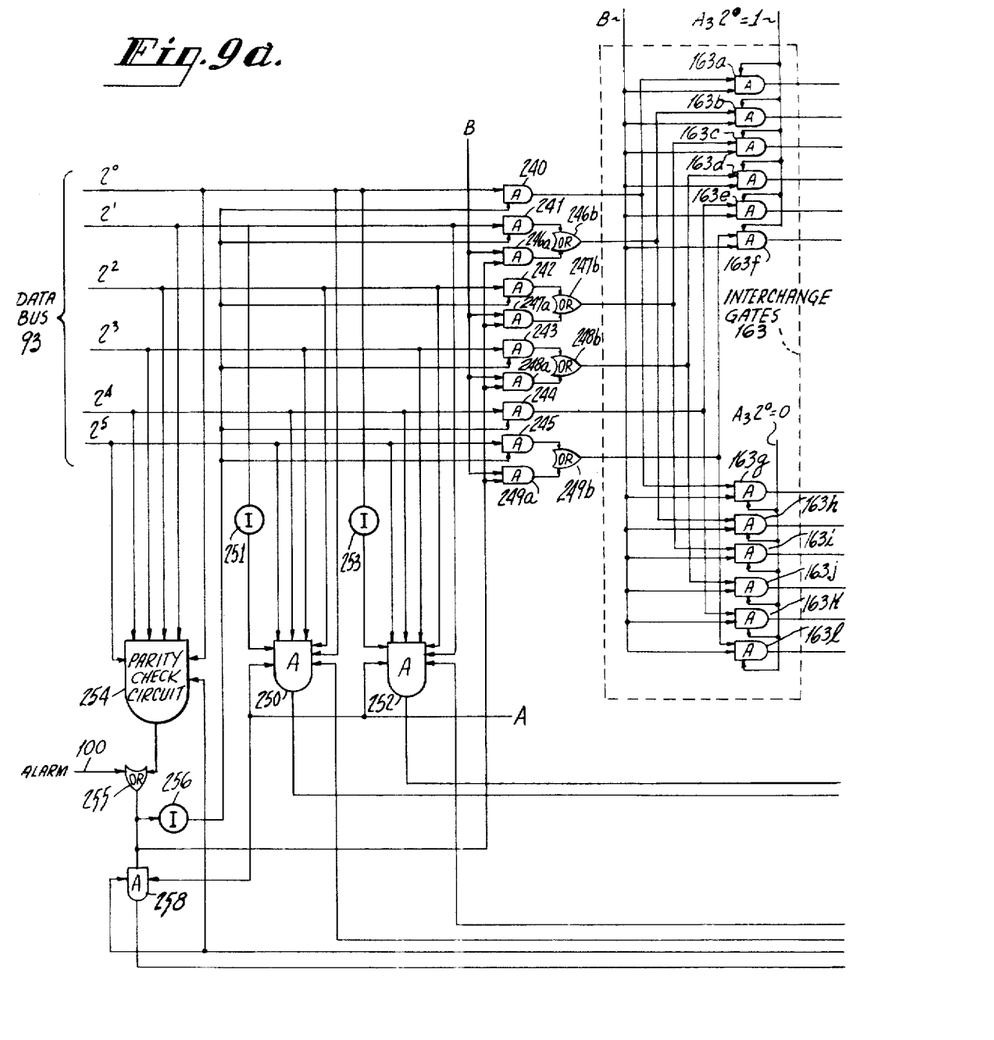
FIGS. 9a–9c, is a more detailed block circuit diagram of certain portions of the control unit 10 of FIG. 2.
Figure 9B:
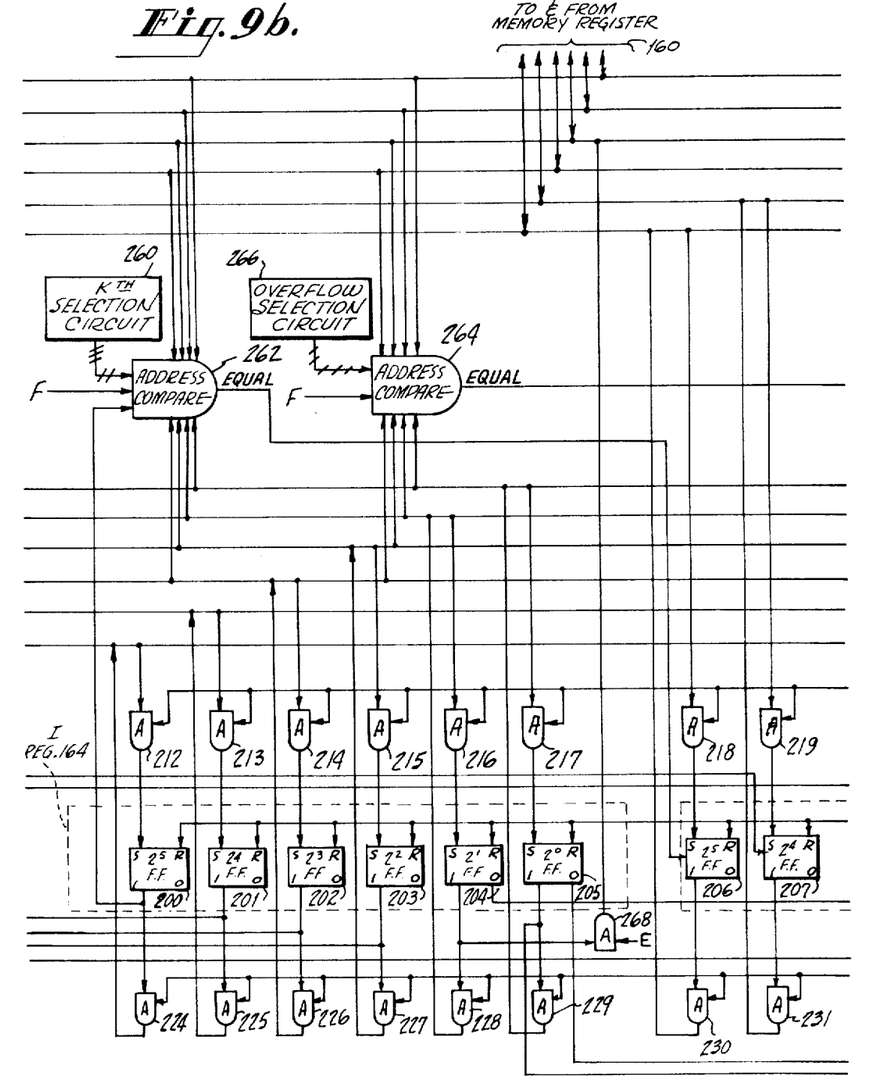
Figure 9C:
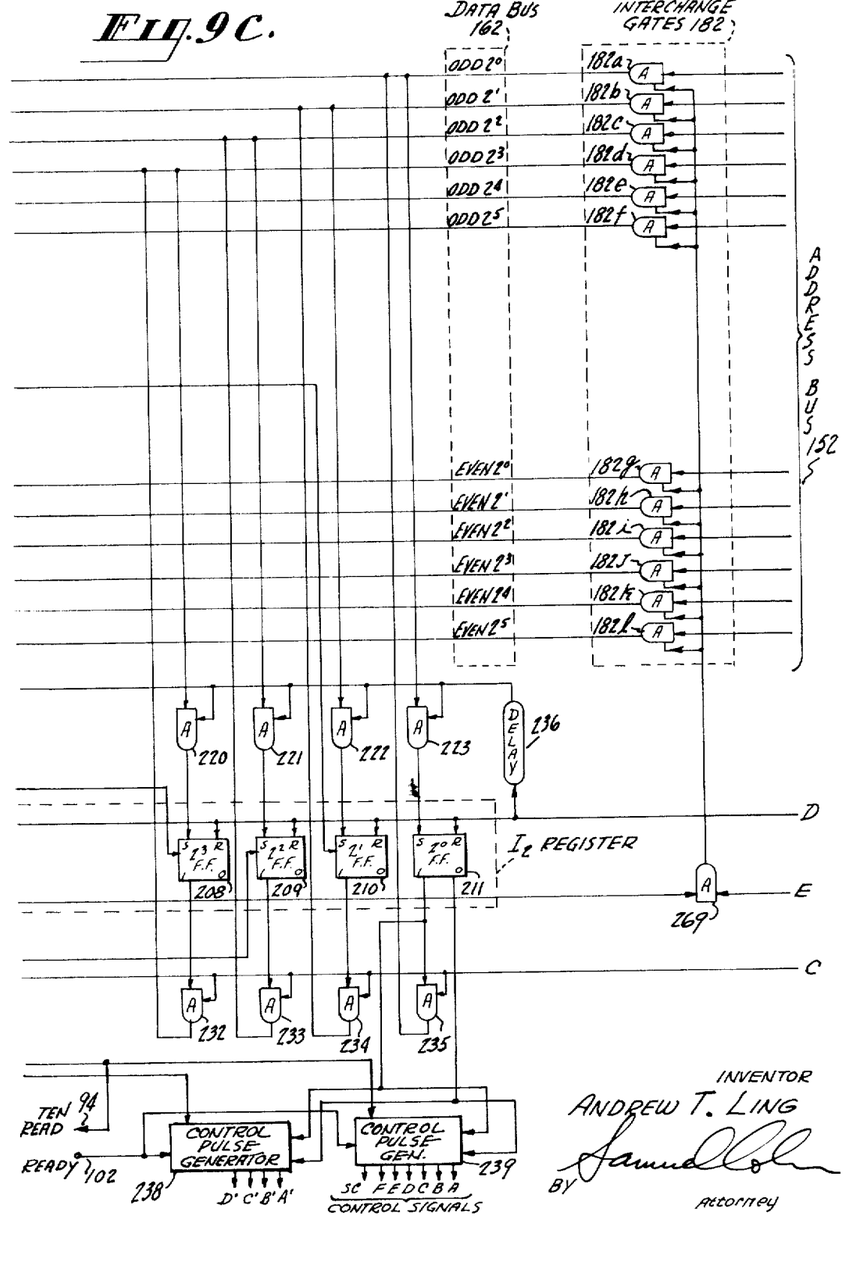

FIG. 9 should now be referred to. It describes typical operations with respect to an input buffer which involve the $I_1$ and $I_2$ characters. As in the description of an input buffer operation in FIGURES 3 and 7, the $I_1$, $I_2$ characters are transferred from the memory register 160 (see FIG. 9b) via the data bus 162 (FIG. 9c) into the $I_1$ register 164 (FIG. 9b) and $I_2$ register 166 (FIG. 9c). The $I_1$, $I_2$ bits on the data bus 162 enter the $I_1$ register stages 200 to 205 via the input AND gates 212 to 217, respectively, and $I_2$ register stages 206 to 211 via the input AND gates 218 to 223, respectively. The other input to the AND gates 212 to 223 is a control signal D generated by the control pulse generator 239 and delayed by the delay means 236 (see 15 of FIGURE 3). The operation depicted by block 15 of FIGURE 3 is dependent only upon the ready signal (which is the SS signal of FIGURE 6) and is independent of the content of $I_1$, $I_2$ bit pattern.

In the meantime, the incoming character is now on the data bus 93 (FIG. 9a) but is prevented from entering onto the data bus 162, until the proper time, by AND gates 240 to 245, and the interchange gates 163.

The "0" output of the flip-flop 205 (FIG. 9b) of the $I_1$ register (this lead carries a "1" when bit $I_1$ $2^0$=0) is applied to the pulse generator 239 for the input buffers. If this output is a "1," indicating that communication with an input buffer is called for, the pulse generator 239 (FIG. 9c) is placed in condition to generate control pulses. The 0 output of flip-flop 205 is also connected to the TCU read line 94. A "one" present on this line primes the output AND gates of the buffer causing it to apply data to bus 93, as shown in FIG. 4. The 1 output of flip-flop 205 is connected to the pulse generator 238 for the output buffers. If, as in the example just given, $I_1$ $2^0$=0, then the 1 output of flip-flop 205 is "0" and pulse the pulse generator 238 is placed in condition to generate pulses whereas pulse generator 239 is disabled.

The 1 and 0 outputs of flip-flop 211 (FIG. 9c) of the $I_2$ register, indicative of the value of bit $I_2$ $2^0$, are also connected to the two generators 238, 239. They also control the generators. If the $I_2$ $2^0$ bit is a "1," meaning no operation should be performed, a "0" appears at the 0 output of flip-flop 211 which causes a start scanning (SC) signal to be generated by pulse generator 239. This terminates the communication between the control unit 10 and the particular buffer by having the scanner begin scanning again. This is the flow line 20 in FIGURE 3. If the $I_2$ $2^0$ bit is a "0" a "1" appears at the 0 output of flip-flop 22 and the operation depicted by block 22 of FIGURE 3 takes place.

If $I_1$ $2^4$ bit is a "1," (flip-flop 201 produces a "1" output), AND gate 252 at the left of the figure (near center of FIG. 9a) becomes primed. Another input to this AND gate 252 is a control signal A which is generated during the operation indicated by block 22 of FIG. 3 by pulse generator 239. The remaining inputs to the gate 252 are selected lines from the data bus 93 and inverter 253 such that they form the bit pattern 111110 which is the "delineator code #2," shown in FIGURE 8. If all these inputs to gate 250 are all "1," the output of this gate, which is connected to the set input terminal of flip-flop 207, becomes a "1" for the duration of the control signal A. This causes the $I_2$ $2^4$ bit to be a "1." This indicates that delineator character #2 has been recognized.

In a manner similar to the above, the 1 output of flip-flop 203 (indicative of bit $I_1$ $2^3$) is connected to multiple input AND gate 250. The other inputs to this gate 252 are the control signal A and selected signals from data bus 93 and inverter 251 such that bit pattern 111101 is recognized. If the $I_1$ $2^3$ is a "1," the control signal A is a "1," and all other inputs connected to gate 250 are all "1," the output of this gate, which is connected to the set terminal of flip-flop 208 (bit $I_2$ $2^3$) becomes a "1," and sets that flip-flop ($I_2$ $2^3$=1). To summarize, If $I_2$ $2^3$=1, commanding the control unit to search for delineator character #1, as soon as this character occurs on the data bus, $I_2$ $2^3$ is changed from "0" to "1," indicating that the character has been found.

In addition to the above, a parity check circuit 254 (FIG. 9a) is connected to the data bus 93. It is a well known circuit and need not be discussed here. The parity circuit produces a "1" output when there are an incorrect number of "ones" on data bus 93. The 1 output terminal of flip-flop 203 (FIG. 9b), indicative of the value of bit $I_1$ $2^2$, is also connected to the parity circuit 254. The output of the parity circuit 254 is applied to one of the two inputs to OR gate 255 and the output of the OR gate 255 is connected to the AND gate 258. The other two inputs to the AND gate 258 are the control signal A and the 1 output of $I_1$ register flip-flop 203 (bit $I_1$ $2^2$). Thus, if the parity circuit 254 produces an output, indicating incorrect parity of the character on data bus 93, and the $I_1$ $2^2$ bit is a "1," commanding the control unit to check parity of the incoming character, a "1" will pass through the OR gate 255 and prime the AND gate 258. When the control signal A becomes a "1," the AND gate 258 produces a "1" output. This is applied to the set terminal of $I_2$ $2^2$ bit flip-flop 209, and the $I_2$ $2^2$ bit becomes a "1." This is the parity alarm signal and indicates that the parity of the word on data bus 93 is incorrect.

The OR gate 255 output is also applied to the inverter 256. The inverter 256 is connected to a common input to AND gates 240 to 245. Therefore, when OR gate 255 produces "0," the inverter 256 primes gates 240 to 245 but when an alarm or incorrect parity occurs, the "zero" output of the inverter disables AND gates 240–245.

The second inputs to AND gates 240 to 245 are the respective bits on bus 93. When these gates are primed, the data bus bits are applied to the gates of the interchange circuit 163 either directly or via OR gates 246b, 247b, 248b and 249b, respectively. The second input to the interchange gates 163 is the control signal B generated by pulse generator 239, in a manner similar to that by which control signal A is applied, and as depicted by block 26 of FIGURE 3. The third input to the interchange gates 163 a, b, c, d, e, f is the 1 output of the flip-flop (not shown) in address register 150 (FIG. 7) which flip-flop stores the least significant address bit of the $A_3$ address character ($A_3$ $2^0$). The corresponding third input to interchange gates 163g, h, i, j, k, l is the 0 output of the same flip-flop in the address register 150. Thus, if the $A_2$ $A_3$ address is odd, the gates a, b, c, d, e, f are primed. If the control signal B is also a "1,") the gates 240 to 245 become enabled and apply their output to the odd lines of data bus 162. If the $A_2$ $A_3$ address is even, gates 163g to l become primed, and when the B=1 signal occurs, the AND gates 240–245 apply their outputs through gates 163g to l to the even lines of the data bus.

The output of parity OR gate 255 is also connected directly to AND gates 246a, 247a, 248a and 249a. The other common input to these gates is control signal B. The outputs of AND gates 246a, 247a, 248a and 249a are applied to the OR gates 246b, 247b, 248b and 249b. Therefore, AND gates 246a–249a apply their outputs, when enabled, through OR gates 246b–249b and through the interchange gates 163 to the data bus 162 in a manner similar to that discussed for AND gates 240–245. The connection of AND gates 246a, 247a, 248a and 249a is such that, when enabled, they apply the bit pattern 101110 to data buses 162. Since the bit pattern originated either from AND gates 240 to 245 or AND gates 246a to 249a, and occurs during control signal B, the bit pattern goes into the memory register and from there into the memory. Thus, when the $I_1$ $2^2$ bit is a "1," if parity is correct (circuit 254 produces a "zero") the bit pattern from data bus 93 goes into the memory. However, if parity is incorrect (circuit 254 produces a "one") the bit pattern 101110 is stored in the memory. The memory location (address) in the sub-area at which this bit pattern is stored is, of course, the one addressed by the $A_2$, $A_3$ characters.

The 1 output of flip-flop 200 (bit $I_1$ $2^5$) is connected to an address comparator circuit 262. One-half of the comparator inputs are from the data bus 162. The other half are from the $K^{th}$ selection circuit 260. The address comparator 262 is a binary bit comparison circuit and is well known. The $K^{th}$ selection circuit 260 may be a bank of 8 manually controlled switches which can be arranged to indicate any desired binary value for $A_2$ $A_3$. During the operation depicted by 24 in FIGURE 3, a control signal F is generated by control pulse generator 239, FIG. 9c. If the $I_1$ $2^5$ bit (from flip-flop 205, FIG. 9b) is a "1," and the control signal F, which is applied to another input in the address comparator circuit 262, is a "1," and if the $A_2$ $A_3$ bit pattern on the data bus 162 is equal to that of $K^{th}$ selection circuit 260, the comparator circuit 262 produces a "1." Thus, "1" is applied to the set terminal of flip-flop 206, FIG. 9b, of the $I_2$ register, and this flip-flop then produces an output $I_2$ $2^5$=1. This indicates that the $K^{th}$ character has occurred (see FIG. 8).

Control signal F is also applied to an input to another address comparator circuit 264, FIG. 9b. Half of the other inputs to the circuit are from data bus 162 and the other half are from the overflow selection circuit 26. The overflow selection circuit 266 is also a bank of 8 manually controllable switches. The output of the comparator 264 is applied to the set terminal of flip-flop 210, FIG. 9c (this flip-flop stores the $I_2$ $2^1$ bit). If control signal F is a "1" and the bit pattern on the data bus 162 is equal to that of the overflow selection circuit 266, the output of circuit 264 becomes a "1" and sets the flip-flop 210 ($I_2$ $2^1$ becomes equal to "1").

The 0 output of the flip-flop 204 (this flip-flop stores the $I^1$ $2^1$ bit) is connected to one input of AND gate 269 (FIGURE 9c). The second input to this gate is the control signal E generated by pulse generator 239 during the operation depicted by block 32 of FIG. 3. The output of AND gate 269 is applied to a common input to interchange gates 182. If the $I_1$ $2^1$ bit equals "zero" (the 0 output of flip-flop 204 is a "1") and the control signal E is also a "1," the AND gate 269 produces an output which primes the interchange gates 182. The latter then pass the $A_2$ $A_3$ characters present on the address bus 152 to the data bus 162. From data bus 162, the $A_2$ $A_3$ characters are returned to the memory location addressed by $A_0$, $A_1$, 00, 01. If $I_1$ $2^1$=1 (the 0 output of flip-flop 204 is a "0") AND gate 269 is disabled and its "0" output inhibits the interchange AND gates 182. This prevents the characters on address bus 152 from passing to the data bus 162.

The 1 output of flip-flop 204 is connected to AND gate 268, FIG. 9b. If $I_1$ $2^1$=1 during the period control signal E is a "1," the AND gate 268 becomes enabled and applies a "1" to the odd $2^2$ line of data bus 162. This, in effect, causes the bit pattern 04 (000100) to appear on data bus 162 and this pattern is applied from the data bus to the memory location addressed by 00, 01.

The control pulse generator can be one of a number of different known networks which generate sequential output pulses in response to input signals. Accordingly, its details are not discussed here.

When the $I_1$ $2^0$ bit is a "1," the pulse generator 238 is primed and generates control pulses which control the operation of output only buffers in a manner similar to that described above for the input buffers.

The alarm signal line 100 from the buffer may be connected to the parity OR gate 255 of FIGURE 9a. When this signal is a "1," the OR gate 255 is enabled and the end result is the same as when incorrect parity is detected by the parity check circuit 254.

Summarizing briefly, the operation of the system of the invention has been illustrated by a number of specific examples. The control unit 10 serves as a link between numbers of peripheral equipments and a data processing machine. The high speed memory of the data processing machine includes sub-areas which are set aside for the respective peripheral units. These sub-areas store both the data received from (or destined for) the different peripheral units and also the $I_1$ and $I_2$ instruction characters. Some of the I bits are instructions to perform operations and other of the I bits indicate the status of these operations as, for example, whether or not completed.

The control unit 10 has the ability to read out the various bits of the I character from a particular sub-area of the memory, to modify the I bits, and then to return them to the same locations. Further, as the $I_1$ and $I_2$ characters are stored in the memory of the data processing machine, they can be operated on by program instructions. The normal running program in the data processing machine can, during relatively short intervals within the program, sense the bit configuration of the $I_2$ characters, for example, and in this way have knowledge of the operational status of the memory sub-area in which that $I_2$ character is located. Thus, the $I_1$ and $I_2$ characters are the indirect communication link between the control unit 10 and the program concurrently running in the data processing machine and there is no need for "hardware" program interrupt lines between the data processing machine and the control unit 10.

During any running program in the data processing machine, the control unit 10 may be receiving and operating on data and may be placing this data into the memory of the data processing machine. The running program in the data processing machine provides occasional entrance to a program sub-routine in which the $I_2$ characters stored in the different sub-areas are scanned to determine whether data in a memory sub-area (data from a buffer entered into the memory by the control unit) should be processed or whether the running program should be continued instead.

The I characters, stored in the sub-area of the memory, are no different from any other data characters in the other parts of the memory. They can be operated on by any and all machine order codes. The indicator scanning process is a programmed sub-routine, using a standard repertoire of order codes, such as those in the 301 programmer's manual. Since the I characters are in specific locations (02, 03) in each sub-area in the memory, the sub-routine can operate on the appropriate bits of the characters by a series of logical operations calling for these locations, followed by a conditional transfer of control. If none of the logical operations shows a positive result, the sub-routine modifies the I character address to the next sub-area and repeats the same logical operation and conditional transfer of control sequence. If all sub-areas have been so scanned and no positive result (no bit of an I character equals 1) found, the sub-routine transfers control back to the normal data processing program for the next program step. If a positive result is found for a sub-area, the sub-routine transfers to the appropriate section of the program that takes proper action according to the condition detected. Proper action may be to transfer the data from the sub-area to magnetic tape and to reset the appropriate indicator bits in the I characters. When this is done, the program transfers control back to scan the rest of the sub-areas until all sub-areas are scanned and are found to have no positive result for the logical operation. In this case, the sub-routine transfers control back to the normal data processing program for the next program step.

It should be noted that the scanning and the processing sub-routines for the data in the sub-areas of the memory are just parts of the normal running program in the data processing machine as far as the control unit 10 is concerned. Therefore, during the running of these sub-routines, the control unit can continue to interrupt, when necessary, to access into the same memory sub-area being operated on by the sub-routines or any other memory sub-areas.

If the rate of data flow from the control unit 10 is very slow or very sporadic, the data processing system can be performing other operations and can return to process the data stored in its memory by the control unit only occasionally, when a sufficient amount of data has been entered there. For example, when an input peripheral unit is a telegraph input line which supplies data in individual message format, and it is desired to record the data serially on a magnetic tape, it may take time to accumulate a complete message in a sub-area of the data processing machine memory since the message is sent to a character at a time. The data processing machine may, while waiting, be programmed to process information received from a card reader and to apply the processed information to a printer. The program may be so set up that for every 10 cards which are read, a program sub-routine is initiated in which the sub-areas in the memory of the data processing system are checked to determine if a message has been accumulated in a sub-area. This is done in the data processing machine by sensing the I characters stored in the respective sub-areas in the memory of the data processing machine. For example, the program sub-routine may include a check for the presence of the $I_2$ $2^4=1$ bit, indicating that the delineator 2 character has occurred (assuming that the delineator #2 character indicates an end of message). If there is no message fully accumulated in any sub-area of the memory, the data processing machine returns to its original program of reading cards and printing them out. If a complete message has accumulated in a particular sub-area, the data processing machine reads the message out of the memory sub-area onto a magnetic tape during a sub-routine in the main program, and then, returns to card reading and printing. The use of the I characters permits the data processing machine to be released to do other useful work while the control unit 10 is applying data to the memory of the data processing machine and without having to have the data processing machine tend to the control unit 10 at all times.

The control unit 10, in addition to transferring data between the data processing machines and the peripheral units and vice versa, is capable also of transmitting control orders (instructions). Accordingly, in its broader aspect, one or several of the peripheral devices can even be other data processing systems.

What is claimed is:

1. In a data processing system, a plurality of buffers, each for storing data bits; a memory having a like plurality of sub-areas, one for each buffer, each sub-area storing in a given location thereof instruction bits indicative of operations to be performed on data bits transferred between that sub-area and its buffer; and a control unit responsive to a ready condition of a buffer, for performing the operations called for by the instruction bits stored in the corresponding sub-area of the memory, and transferring the data bits on which said operations are performed between said memory sub-area and its buffer.

2. In a data processing system, a plurality of buffers, each for storing characters; a memory having a like plurality of sub-areas, one for each buffer, each sub-area storing in a given location thereof an instruction character indicative of operations to be performed on data characters transferred between that sub-area and its buffer, each sub-area including a plurality of other locations in which data characters may be stored; and a control unit responsive to a ready condition of a buffer, for performing the operations called for by the instruction character stored in the corresponding sub-area of the memory, and transferring the data character on which said operations are performed between said memory sub-area and its buffer.

3. In a data processing system, a plurality of buffers, each for storing bits; a memory having a like plurality of sub-areas, one for each buffer, each sub-area including a plurality of locations for storing data bits, at least one location storing an indirect address within said sub-area, and each sub-area storing in a given location thereof instruction bits indicative of operations to be performed on data characters transferred between that sub-area and its buffer; and a control unit responsive to a ready condition of a buffer, for effecting the transfer of a data character between said buffer and the indirect address stored within the corresponding sub-area of said memory, and for performing on said data character the operations called for by said instruction bits stored in said sub-area.

4. In a data processing system, a plurality of buffers, each for storing characters; a memory having a like plurality of sub-areas, one for each buffer, each sub-area including a plurality of locations for storing data characters, and each sub-area storing in a given location thereof some instruction bits indicative of operations to be performed on data characters transferred between that sub-area and its buffer and other instructions bits indicative of the status of said data; and a control unit responsive to a ready condition of a buffer, for effecting the transfer of a data character between said buffer and the corresponding sub-area of said memory, for performing on said data character the operations called for by some of said instruction bits stored in said sub-area, and for changing the value, if necessary, of some of said instruction bits stored in said sub-area to indicate the status of the transferred data.

5. In a data processing system,
a plurality of buffers, each for storing characters;
a memory having a corresponding plurality of sub-areas, one for each buffer, each sub-area including a plurality of locations for storing data characters, each sub-area storing in a given location thereof some instruction bits indicative of operations to be performed on data characters transferred between that sub-area and its buffer and other instruction bits indicative of the status of said data, and each sub-area storing in another location thereof an indirect address;
a control unit responsive to a ready condition of a buffer, for effecting the transfer of a data character between said buffer and the indirect address stored in the corresponding sub-area of said memory, for performing on said data character the operations called for by some of said instruction bits stored in said sub-area, for changing the value, if necessary, of some of said instruction bits stored in said sub-area to indicate the status of the transferred data and for changing the indirect address stored in said sub-area; and a data processing machine of which said memory is a part, for scanning, during spaced intervals of its operation, said instruction bits indicative of status and, in response thereto, effecting the processing of the data in said sub-areas.

6. In a data processing system,
a plurality of buffers, each for storing characters;
a memory having a corresponding plurality of sub-areas, one for each buffer, each sub-area including a plurality of locations for storing data characters, and each sub-area storing in a given location thereof some instruction bits indicative of operations to be performed on data characters transferred between that sub-area and its buffer and other instruction bits indicative of the status of said data;
a control unit responsive to a ready condition of a buffer, for effecting the transfer of a data character between said buffer and the corresponding sub-area of said memory, for performing on said data character the operations called for by some of said instruction bits stored in said sub-area, and for changing the value, if necessary, of some of said instruction bits stored in said sub-area to indicate the status of the transferred data;
and a data processing machine of which said memory is a part, for scanning, during spaced intervals of its operation, said instruction bits indicative of status and, in response thereto, effecting the processing of the data in said sub-areas, and, after said processing is completed, changing the value of at least one of said instruction bits.

7. In a data processing system, a plurality of buffers, each for storing data bits; memory means for storing, in given locations thereof, instruction bits indicative of operations to be performed on data bits transferred between the respective buffers and the memory means; and a control unit responsive to a ready condition of a buffer, for performing the operations called for by the instruction bits for that buffer which are stored in the memory means, and for transferring the data bits on which the operations are performed between said memory means and the ready buffer.

References Cited by the Examiner

UNITED STATES PATENTS

| 3,029,414 | 4/1962 | Schrimpf | 340—172.5 |
| 3,061,192 | 10/1962 | Terzian | 340—172.5 |
| 3,063,036 | 11/1962 | Reach | 340—172.5 |
| 3,117,306 | 1/1964 | Reitfort | 340—172.5 |
| 3,202,972 | 8/1965 | Stafford | 340—172.5 |

FOREIGN PATENTS

| 1,124,272 | 2/1962 | Germany. |
| 531,510 | 10/1956 | Canada. |
| 902,778 | 9/1962 | Great Britain. |

ROBERT C. BAILEY, *Primary Examiner.*

R. L. BERGER, *Assistant Examiner.*